United States Patent Office 3,189,665
Patented June 15, 1965

3,189,665
BLOCK COPOLYMERS
Kenzie Nozaki, El Cerrito, Calif., assignor to Shell Oil Company, New York, N.Y., a corporation of Delaware
No Drawing. Filed June 22, 1961, Ser. No. 118,789
11 Claims. (Cl. 260—88.1)

This invention relates to new block copolymers and their preparation. More particularly, the invention relates to new block copolymers prepared from polymers of alkenyl-substituted aromatic compounds, to their preparation and utilization.

Specifically, the invention provides new and particularly valuable block copolymers prepared from polymers of alkenyl-substituted aromatic compounds, such as polystyrene. These new products comprise copolymers wherein the macromolecules are made up of at least two different linear segments joined in an end to end arrangement, the first segment being made up of a linear polymer of an alkenyl-substituted aromatic compound, such as styrene, and the other segment being made up of a polymer of at least one monomer containing a single $CH_2=C=$ group and being dissimilar to the monomer unit in the first segment. The invention further provides a process for the preparation of the above-noted new block copolymers.

This application is a continuation-in-part of my application Serial No. 566,774, filed February 21, 1956, now U.S. Patent No. 2,991,269, which in turn is a continuation-in-part of application Serial No. 270,278, filed February 6, 1952, now abandoned, which in turn is a continuation-in-part of application Serial No. 60,416, filed November 16, 1948, now abandoned.

Attempts have been made in the past to improve the properties of many of the homopolymers of the unsaturated monomers by copolymerizing the said monomers with various dissimilar compounds, the homopolymers of which display the desired superior properties. These copolymers have been prepared heretofore by merely mixing the unsaturated compound with the desired dissimilar monomer and then subjecting the resulting mixture to polymerization conditions, such as heat, light and catalysts. When combined under these conditions, the two monomers usually add to the polymer chain in a more or less random fashion and the resulting polymer chains are made up of a very complicated arrangement of the two kinds of monomers. Copolymers prepared from monomers A and B, for example, will have the A and B units arranged in some such order as

ABAABBBABBAABB

This method of producing the desired copolymers is not entirely satisfactory. It has been found, for example, that when the monomer units are distributed throughout the polymer chains in the above-described manner they will fail to impart the properties of their corresponding homopolymers and the resulting copolymers in many cases possess an entirely different set of properties. Furthermore, as there is no definite control over the order in which the monomers add to the polymer chain, the copolymers produced by this process rarely, if ever, have the same molecular structure or physical properties and standardization of the copolymers and their applications is quite difficult.

It is, therefore, an object of the present invention to provide a new kind of copolymer. It is a further new kind of copolymer which possesses many of the characteristic properties of the homopolymers of the individual monomers making up the said copolymer. It is a further object to provide a new type of copolymer having many unusual and beneficial properties. It is a further object to provide internally plasticized polymers of the monomers which generally form hard, brittle homopolymers. It is a further object to provide novel segmented copolymers having unexpected properties as detergents, dispersing agents and the like. It is a further object to provide new segmented copolymers having improved impact strength. It is a further object to provide new copolymers which have a uniform molecular weight. It is a further object to provide new block copolymers free of contaminating homopolymers. These and other objects of the invention will be apparent from the following detailed description thereof.

It has now been discovered that these and other objects may be accomplished by the new block copolymers of the present invention comprising copolymers wherein the macromolecules are made up of at least two different linear segments joined in an end-to-end arrangement, the first segment being made up of a linear polymer of an alkenyl-substituted aromatic compound, such as styrene, and the other segment being made up of a polymer of at least one monomer containing a single $CH_2=C=$ group and being dissimilar to the monomer unit in the first segment. These new block copolymers are prepared by adding a preformed linear polymer of the monomer comprising an alkenyl-substituted aromatic compound which has a molecular weight of at least 50,000 to a liquid medium containing an ethylenically unsaturated monomer which is dissimilar to the monomer unit contained in the preformed polymer, and then subjecting the resulting mixture in an inert atmosphere to mechanical agitation to degrade the said preformed polymer. In the presence of the mechanical agitation, the preformed polymer chains are broken to form free radicals, and when the chains are broken in the presence of a polymerizable monomer, that monomer adds to the chains to form a new type block copolymer. The resulting copolymer is thus made up of a segment of the initial preformed polymer joined in an end-to-end arrangement through a carbon-to-carbon linkage to the second segment of polymer made up of units of the monomer employed in the liquid reaction mixture. Such products may be represented for example by the structure AAAAAAAAAAABBBBBBBBBBB wherein A is the unit of the monomer in the preformed polymer and B is the unit of the monomer in the reaction mixture.

The different molecular structure of the copolymer of the present invention as discussed above endows them with properties which are entirely different from those possessed by the conventional copolymers. As indicated above, the conventional copolymers lose the characteristic properties of the homopolymers of the monomers making up the said copolymers and assume properties which are entirely different. The copolymers of the present invention, on the other hand, retain many of the characteristic properties of the homopolymers of the individual monomers. A copolymer made up of a segment of polystyrene joined to a segment of polymethacrylonitrile produced by the process of the invention will, for example, possess the characteristic properties of both polystyrene and polymethacrylonitrile.

An important application of the process of the invention is its use in the production of "internally" plasticized polymers, i.e., polymers wherein the plasticizer is joined to the polymer through a primary chemical bond. The production of this type of polymer is accomplished by selecting as the inducing polymer, i.e., the preformed polymer, a polymer which needs to be softened or plasticized, such as polystyrene, and using as the added monomer a compound which would ordinarily form a soft, plasticizing polymer, such as vinyl acetate. The resulting product is a polymer that possesses substantially all the desired properties of the hard brittle polymer and the flexibility of the soft, flexible polymer. As the plasticizer is chemically bound in the molecule, there is no danger of its loss through migration or volatilization.

A further advantage is the production of copolymers having improved physical properties, such as improved impact strength. In this case, the initiation polymer may be a polymer deficient in impact strength, such as polystyrene, and the added monomer may be one which forms softer and more flexible polymer, such as butadiene or isoprene. In this case, the resulting product has greatly improved impact strength but still possesses the advantageous properties of the initial preformed polymer, such as polystyrene.

A still further important application of the process of the invention is its use in the preparation of polymers having unexpected solution behavior. Polymers having the unexpected property of having solubility in both water and oil may be obtained by the novel process, for example, by employing as the inducing polymer a hydrocarbon polymer, such as polystyrene, and as the unsaturated monomer a compound having groups that have water soluble characteristics or could be converted to groups having water soluble characteristics, such as vinyl acetate, acrylonitrile, methyl methacrylate, and the like, or alternatively by employing a polymer having water soluble characteristics or being able to be converted to a water soluble polymer as the inducing agent, and the hydrocarbon component as the unsaturated monomer. Copolymers prepared in this manner are particularly useful as detergents and as dispersing agents for preparing suspensions and emulsions of various components, such as metal oxides, that will not be precipitated either in aqueous or hydrocarbon systems.

Additional advantage of the process is found in the fact that it may be accomplished in the absence of catalysts and relatively high temperature and yields products of higher quality and more uniform molecular weight.

The copolymers of the present invention are distinguished in structure and properties from the copolymers prepared by forming a prepolymer of a polyethylenically unsaturated monomer, such as piperylene, and then polymerizing another monomer at the remaining unsaturation in the prepolymer molecule. As the unsaturated prepolymer will possess unsaturated linkages in the main chain, such as

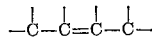

and/or in the side chains, such as

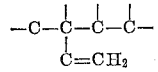

the resulting copolymer will always have the dissimilar monomers adding on at the side of the main polymer chain and the product will be a highly branched copolymer having a structure, such as

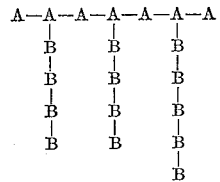

wherein A is the monomer unit derived from the polyunsaturated compound and B is the monomer unit of the dissimilar monomer.

The copolymers prepared from the prepolymers of the polyunsaturated compounds, such as piperylene, as described above, will not have any of the superior properties of the segmented copolymers of the present invention. Such copolymers will have the dissimilar monomers distributed along the main polymer chain and the properties will generally be the same as those of the conventional copolymer which are prepared by mixing the monomers at the beginning of the polymerization. Further, copolymers prepared from the prepolymers of the polyunsaturated compounds will be highly branched and thus have higher viscosity and poorer solubility and compatibility characteristics than the unbranched polymers as shown in the example at the end of the specification.

The preformed polymer to be used in the process of the invention may be any linear polymer of an alkenyl-substituted aromatic compound or when the reverse procedure is used, a linear polymer of the dissimilar monomer as described hereinafter. By linear is meant one that is not crosslinked and is substantially free of aliphatic carbon-to-carbon unsaturated linkages, i.e., unable to undergo further polymerization with unsaturated monomers when heated in the presence of a peroxide catalyst. As noted above the preformed polymer undergoes polymerization in the present process by means of free radicals formed when the polymer is broken, and the polymerization is not due to the presence of any unsaturated linkage in the molecule itself.

The alkenyl-substituted aromatic compounds include those compounds having an alkenyl group, and preferably a 1-alkenyl group, e.g., a vinyl group, attached to a ring carbon atom of an aromatic ring. Examples of these include, among others, styrene, alphamethylstyrene, vinyltoluene, 2-chlorostyrene, 4-chlorostyrene, 2,4-dichlorostyrene, 2,5-dichlorostyrene, vinyl naphthalene, 2-methylstyrene, 2,4-diethylstyrene, 2,3,4-trimethylsyrene, 2,4-diisobutylstyrene, 3-tert-butylstyrene, 4-octylstyrene, allyl styrene, 4-cyclohexylstyrene, and the like, and mixtures thereof. Preferred alkenyl-substituted aromatic compounds include styrenes, such as styrene itself and the halo-substituted styrenes and the styrenes substituted with hydrocarbon radicals preferably containing from 1 to 10 carbon atoms, the substituents being on the vinyl side chain or on the aromatic ring. Particularly preferred are styrene, alpha-alkylstyrenes and the mono- and dichloro- and mono- and polyalkyl-substituted styrenes wherein the substituents are attached to the ring carbon atoms, said substituted styrenes containing up to 12 carbon atoms.

The preformed polymers of the above-described alkenyl-substituted aromatic compounds include the homopolymers of the said alkenyl-substituted aromatic compound as well as the copolymers and interpolymers of the said alkenyl-substituted aromatic compounds with other polymerizable unsaturated compounds such as described hereinafter for the monomers to be added to the reaction mixture for copolymerization with the preformed polymer.

The preformed polymers noted above can be produced by any suitable method. They may be produced, for example, by addition reactions, condensation reactions, and the like. The reactions may be energized if desired by light and/or heat and may be accomplished in the presence of any type polymerization catalyst, such as peroxides, peracids, persalts, peresters, metals, inorganic salts, Friedel-Crafts type catalysts and the like. The polymers may be prepared by bulk polymerization, in a solvent solution or in an aqueous emulsion or aqueous suspension. Polymers prepared by a previous operation of the process of the present invention may also be utilized.

Examples of preformed polymers to be used in the process of the invention are the relatively high molecular weight linear polymers of the compounds of the group consisting of the polystyrene, poly(alpha-methylstyrene), poly(vinyltoluene), poly(vinylnaphthalene), poly(2,5-dichlorostyrene), poly(4-chlorostyrene), poly(4-octylstyrene), and copolymers of styrene or alpha-methyl styrene and vinylidene halides, acrylic acid and alpha-alkyl substituted acrylic acids wherein the alkyl radical contains from 1 to 4 carbon atoms, the alkyl esters of acrylic acids and alpha-alkyl substituted acrylic acids wherein the alkyl radical in the alcohol portion of the ester radical contains from 1 to 6 carbon atoms and the alkyl radical substituted on the acrylic acid contains from 1 to 4 carbon atoms, the vinyl esters of the saturated monocarboxylic acids containing from 1 to 6 carbon atoms, the vinyl esters of the halogen acids, isobutylene, acrylonitrile, methacrylonitrile, ethacrylonitrile, styrene, and alpha-methylstyrene.

The molecular weight of the preformed polymers should be sufficiently high to permit a degradation of the polymer molecule when the said polymer is subjected to the subsequent agitation treatment. The molecular weight of the preformed polymers used in the process of the invention will, therefore, vary over a considerable range depending upon the ease with which the individual polymer may be degraded, the intensity of the agitation treatment, etc. In some cases, polymers having molecular weights as low as $5 \times 10^4$ may be used in the process. In other cases polymers having a molecular weight as high as $9 \times 10^6$ or higher may be used. The preferred polymers to be used in the process have molecular weights between $7.5 \times 10^4$ and $7 \times 10^6$. These molecular weights were determined by measuring the intrinsic viscosity of the polymer in solution and calculating the molecular weight as discussed by P. J. Flory in the Journal of the American Chemical Society, 65 372 (1943).

The monomers to be mixed with the above-described preferred polymers may be any of the polymerizable organic compounds containing at least one polymerizable ethenoid group, i.e., organic compounds containing at least one polymerizable $>C=C<$ group. The monomer selected, of course, should be dissimilar to the monomer used in making the initial preformed polymer as noted above so that there will be a difference in the structure of the final segments.

These polymerizable olefinic compounds may be exemplified by maleic and fumaric acids and their esters, the tetrahalo-ethylenes, the esters of the unsaturated diols, etc. Preferred polymerizable olefinic compounds to be employed in the process of the invention are the vinyl-type compounds, i.e., those polymerizable organic compounds containing at least one $CH_2=C<$ group in their molecule. Examples of such monomers are the butadienes, such as butadiene-1,3,2,3-dimethylbutadiene-1,3, piperylene, isoprene, chloroprene, the aromatic compounds such as styrene, alpha-methylstyrene, dichlorostyrene, vinylnaphthalene, vinyl phenol and the like. Other examples of the vinyl-type compounds are the unsaturated acids, such as acrylic acid and the alpha-alkyl substituted acrylic acids, such as alpha-methyl acrylic acid and alpha-butyl acrylic acid; the esters of these unsaturated acids, such as methyl acrylate, methyl methacrylate, butyl methacrylate, and propyl acrylate; the vinylidene halides, such as vinylidene chloride and vinylidene bromide; the vinyl esters of inorganic acids, such as the halogen acids, and hydrocyanic acid, as vinyl chloride, vinyl bromide, acrylonitrile, and methacrylonitrile; the vinyl esters of the monocarboxylic acids, such as vinyl acetate, vinyl chloroacetate, vinyl benzoate, vinyl laurate, vinyl valerate, and vinyl caproate; the vinyl esters of the polycarboxylic acids, such as divinyl succinate, divinyl adipate, vinyl allyl phthalate, vinyl methallyl pimelate, and vinyl methyl glutarate; the vinyl esters of the unsaturated acids, such as vinyl acrylate, vinyl crotonate, and vinyl methacrylate; the vinyl ethers, such as vinyl ethyl ether, vinyl butyl ether, and vinyl allyl ether; and the vinyl ketones, such as vinyl butyl ketone, and vinyl ethyl ketone. The group also includes the allyl derivatives, such as the allyl esters of the monocarboxylic acids, as allyl acetate and allyl butyrate; the allyl esters of the polycarboxylic acids, such as diallyl phthalate, diallyl adipate, and diallyl succinate; the allyl esters of the inorganic acids, such as allyl chloride, methallyl chloride, etc.; the allyl esters of the unsaturated acids, such as allyl acrylate, allyl crotonate, and methallyl methacrylate, and the allyl ketones, allyl ethers, and the like.

A preferred group of vinyl-type compounds are the members of the group consisting of the vinylidene halides, acrylic acid and alpha-alkyl substituted acrylic acids wherein the alkyl radical contains from 1 to 4 carbon atoms, the alkyl esters of acrylic acid and alpha-alkyl substituted acrylic acids wherein the alkyl radical in the alcohol portion of the ester radical contains from 1 to 6 carbon atoms and the alkyl radical substituted on the acrylic acid contains from 1 to 4 carbon atoms, the vinyl esters of the acrylic acid and alpha-alkyl substituted acrylic acid wherein the alkyl radical contains from 1 to 4 carbon atoms, the vinyl esters of the saturated monocarboxylic acids containing from 1 to 6 carbon atoms, the vinyl esters of the halogen acids, isobutylene, acrylonitrile, methacrylonitrile, ethacrylonitrile, styrene, and alpha-methylstyrene. Examples of this preferred group of vinyl-type compounds are vinylidene chloride, vinylidene bromide, vinylidene iodide, methyl acrylate, butyl acrylate, butyl alpha-butyl acrylate, vinyl acrylate, vinyl acetate, vinyl butyrate, vinyl methacrylate, and the like.

In case the monomer is to be added to produce a plasticizing effect on the resulting polymer the ones selected will be those which form polymers which are softer and more flexible than the preformed high molecular weight, linear polymer, such as methyl methacrylate, vinyl acetate, vinyl propionate, vinyl butyrate, methyl acrylate, and the like.

In case the reverse procedure is employed, polymers of the above-described monomers may be utilized in place of the polymers of the alkenyl-substituted aromatic compounds. These polymers have the same characteristics as described above for the linear polymers of the alkenyl-substituted aromatic compounds and the same conditions for the process apply.

Particularly outstanding block copolymers, especially because of their ability to be molded to form attractive plastic articles are those wherein one of the segments is a polymer of an alkenyl-substituted aromatic compound, and the other segment is made up of a polymer of a monomer of the group consisting of esters of unsaturated alcohols and carboxylic acids, alkenes, vinyl halides, vinylidene halides, ethylenically unsaturated nitriles, alkenyl ethers and alkenyl ketones.

Coming under special consideration are the block copolymers wherein one of the segments is a polymer of an alkenyl-substituted aromatic compound containing up to 10 carbon atoms, and especially styrene, and the other segment is made up of a polymer of a monomer of the group consisting of alkenyl esters of monocarboxylic acids containing up to 10 carbon atoms, alkenes containing from 2 to 5 carbon atoms, vinyl chloride, vinylidene chloride, compounds of the formula R—CN wherein R is an ethylenically unsaturated hydrocarbon radical containing up to 8 carbon atoms, and especially acrylonitrile, alkenyl alkyl ethers containing up to 8 carbon atoms, and alkenyl alkyl ketones containing up to 10 carbon atoms.

The reaction is generally accomplished in a liquid medium. The monomer or monomers to be polymerized, if liquid, may themselves form the medium or liquids, such as water, organic solvents or diluents, such as benzene, cyclohexane, xylene, hexane, diheptyl ether, and the like, and mixtures thereof may be added to the reaction mixture. In most cases, it is preferred to use only the monomer as the reaction medium and to employ conditions to maintain the monomer in the liquid phase. The medium need not dissolve the polymer, but it has been found that better results are obtained if there is at least a partial dissolution of the polymer.

The quantity of the preformed inducing polymer to be added to the reaction may vary over a considerable range. In most instances, it is desirable to keep the amount of polymer at a relatively low level so that there will be more opportunity for the chains to be spread out and broken near the middle. If the medium becomes too concentrated with respect to the polymer, the polymer chains may become entangled and only those segments sticking out of the bundle may be broken. Preferably the polymer is employed in amounts varying from 0.5 to 10 parts per 100 parts of medium, and more preferably from 0.8 to 5 parts per 100 parts of medium.

The amount of dissimilar monomer to be present in the reaction mixture will also very over a wide range. If the monomer is employed as the liquid medium for the reaction, the amount of monomer will be relatively large in order to obtain the desired degree of dilution. In that case, the reaction may be stopped as soon as the desired amount of monomer has been added to the polymer chain. In case another reaction medium, such as an inert solvent is employed, the amount of monomer added will depend generally upon the amount of monomer that is to be added to the polymer chains.

Molecular oxygen will inhibit the polymerization reaction and it is usually desirable to remove the oxygen from the reaction chamber before the degradation is commenced. In the case of a few monomers, such as styrene, however, small quantities of oxygen may be tolerated. The removal of the oxygen may be accomplished by any suitable method. It is preferably accomplished by freezing the mixture of preformed polymer and monomer and evacuating the reaction chamber by means of a pump. In some cases, it may be desirable to replace the withdrawn oxygen with an inert gas, such as nitrogen, methane, carbon dioxide, and the like.

The process of the invention may be accomplished in the presence or absence of light. As light has an accelerating affect on the polymerization of some types of monomers, it may be desirable in some cases to conduct the reaction in the presence of light in order to increase the polymerization rate.

The agitation treatment applied to the deoxygenated reaction mixture may be any suitable treatment which will apply sufficient strain and tensions on the bonds of the polymer to break the polymer chains. Mechanical treatments, such as shaking, high speed stirring, milling, grinding, gear and piston pumps, passage through filters and capillaries, are satisfactory. The degradation of the preformed polymer is preferably accomplished by passing the reaction mixture through variously designed throttle values, or narrow orifices at high linear velocity. For this purpose an enclosed system and a circulating gear pump or diaphragm pump capable of generating high hydrostatic pressures have proved very satisfactory. Another preferred method comprises subjecting the reaction mixture to high speed stirring, e.g., stirring at the rate of about 4000 r.p.m.

The amount of shear stress to be applied to the reaction mixture will vary over a considerable range depending upon the type of polymer to be broken, e.g., whether it contains —C—C—, —C—S—, —C—O—, —S—S—, etc., bonds, the molecular weight of the polymer, the viscosity of the solution, etc., but it should be at least sufficient to break the linear polymer. The shear stress applied by the usual slight shaking or stirring of the containers in the laboratory is not sufficient to bring about the desired degradation. In general, the minimum shear stress applied to the solution should be that determined by the following formula $$\frac{2 \times 10^{12}}{(M.W.)^2} = dynes/cm.^2$$

wherein M.W. is the molecular weight of the linear polymer. Preferably with polymers having the main chain consisting chiefly of —C—C—, —C—S—, —C—O—, or —S—S— bonds, which polymers are present in amounts varying from 0.5% to 10% by weight of the reactants, the minimum stress should be determined by the formula $$\frac{1 \times 10^{14}}{(M.W.)^2} = dynes/cm.^2$$

and more preferably $$\frac{2 \times 10^{15}}{(M.W.)^2} = dynes/cm.^2$$

wherein M.W. is the molecular weight of the linear polymer. Increasing the shear stress increases the formation of polymer free radicals and this in turn increases the rate of reaction, so faster reaction rates may be obtained by using shear stresses which are in considerable excess of those described above.

The temperature at which the process may be carried out may also vary considerably. In general temperatures ranging from 0° C. to 250° C. have proved satisfactory. Particularly preferred temperatures range between 0° C. and 100° C. Atmospheric, superatmospheric, or subatmospheric pressures may be used in the process as desired.

The polymers formed in the reaction may be recovered by any suitable means, such as filtration, solvent extraction, dehydration and the like.

The process of the invention may be executed in any convenient type apparatus enabling the maintenance of the proper conditions and the introduction of the various reactants. The process may be carried out in batch, semicontinuous or continuous manner. For large scale production it is preferred to conduct the process in a continuous manner. In such an operation the preformed polymer and monomer or monomers will be continuously added and the polymers continuously removed from the reaction mixture. The operation of the process in a continuous manner is particularly desirable as such an operation presents much more stable conditions and the composition of the resulting polymers are more uniform and of better quality.

As described above, the copolymers produced by the above-described process will be block copolymers, i.e., they are made up of two or more segments of polymers joined in an end-to-end arrangement, the first segment being made up of the preformed polymer of the alkenyl-substituted aromatic compound and the other segment or segments being made up of the polymer of the added monomer or monomers. The copolymers will have molecular weights ranging from about 10,000 to 750,000 (as determined by the intrinsic viscosity measurements as noted above) depending on intensity of the mechanical agitation. In most cases, the molecular weights of the macromolecules will be substantially uniform due to the tendency of the agitation to reduce the macromolecules to the same molecular weight level.

The new copolymers will preferably contain at least 5% by weight of the alkenyl-substituted aromatic compound, and preferably from 5% to 99% by weight of the said material. On a macromolecular structural basis, the molecules should preferably contain at least 5 units of the alkenyl-substituted aromatic compound and at least 5 units of the dissimilar monomer.

The block copolymers of the invention may be used for a variety of applications. They will be hard solid materials which can generally be molded or extruded to form attractive plastic articles. They may also be milled, machined, cut or otherwise formed into articles, such as buttons, table tops, containers and the like. In the molten or solvent solution the polymers may be utilized in the preparation of impregnating agents, laminating agents, surface coatings and the like. They may also be subjected to extrusion and to the injection and compression molding in the presence or absence of added diluents and plasticizers.

To illustrate the manner in which the invention may be carried out the following examples are given. It is to be understood, however, that the examples are for the purpose of illustration and the invention is not to be regarded as limited to any of the specific conditions cited therein.

The deoxygenation of the preformed polymer-monomer mixture in the following examples was accomplished by freezing the said mixture in liquid nitrogen, evacuating on an oil pump, melting, and repeating the step three more times.

The apparatus used for shaking the reaction mixture in the examples below consisted of a cylindrical glass vessel (5.08 cm. in diameter and 12.7 cm. in length) joined on one side to a vertical spring-loaded rod that was in sliding contact with a cam eccentrically mounted on the shaft of an electric motor. When the motor was on, the vessel containing the reaction mixture moved back and forth through a distance of 11.5 cm.

In some of the examples cited below the polymerization has been conducted in the absence of light. This precaution was taken merely to indicate that the polymerization taking place in the reaction mixture was not due to any accelerating effect of light.

EXAMPLE I

About 10 parts of polystyrene having a molecular weight of $6.33 \times 10^6$ are added to 1500 parts of toluene and 2000 parts of isoprene. Tubes containing the mixture are sealed in vacuo, darkened, and then shaken at 330 strokes a minute at room temperature. After about 120 hours of shaking, a large yield of a copolymer made up of a segment of polystyrene joined to a segment of polyisoprene is obtained. A control sample shows no polymerization taking place. Chemical joining of the two segments is determined by solvent extraction technique. The resulting segmented copolymer demonstrated improved impact strength over the straight polystyrene.

Related results are obtained by replacing the isoprene in the above process with an equal amount of butadiene.

EXAMPLE II

About 6 parts of polystyrene having a molecular weight of $6.33 \times 10^6$ are added to 1500 parts of methyl methacrylate and 1500 parts of toluene. Tubes containing the mixture are sealed in vacuo, darkened, and then shaken at 330 strokes a minute at room temperature. After about 120 hours of shaking 128 parts of a copolymer made up of a segment of polystyrene joined to a segment of polymethyl methacrylate is obtained.

EXAMPLE III

About 10 parts of polystyrene having a molecular weight of $6.33 \times 10^6$ are added to 1500 parts of toluene and 1500 parts of vinyl acetate. Tubes containing the mixture are sealed in vacuo, darkened, and shaken at 330 strokes a minute at room temperature. After 100 hours a large yield of a copolymer of polystyrene and polyvinyl acetate is obtained. This internally plasticized copolymer is compared in properties and flexibility with a conventional copolymer of vinyl acetate and styrene. The internally plasticized copolymer possesses substantially the same flexibility as the conventional copolymer and in addition possesses many of the more desirable characteristic properties of polystyrene not possessed by the conventional copolymer.

Related results are obtained by replacing the vinyl acetate with an equal amount of vinyl propionate and methyl acrylate.

EXAMPLE IV

About 10 parts of polystyrene having a molecular weight of $5.4 \times 10^6$ are added to 1500 parts of toluene and 1500 parts of methyl methacrylate. Tubes containing the mixture are sealed in vacuo, darkened, and shaken at 330 strokes a minute at room temperature. After 100 hours, a large yield of a copolymer having a segment of polystyrene joined to a segment of poly(methyl methacrylate) is obtained. The hard solid product could be molded to form attractive plastic particles.

EXAMPLE V 10 parts of the block copolymer prepared in the preceding example are added to 100 parts of toluene and 2500 parts of acrylonitrile. This mixture was deoxygenated and the container was shaken at about 500 strokes a minute at room temperature. The resulting product is an interpolymer made up of a segment of (polystyrene-polymethyl methacrylate) and a segment of polyacrylonitrile.

EXAMPLE VI

About 0.2 parts of polystyrene having a molecular weight of $6.33 \times 10^6$ are added to 20 parts of monomeric vinylidene chloride. Tubes containing the mixture are sealed in vacuo and shaken at 330 strokes a minute at room temperature for one week. At the end of that time, 4.59 parts of a copolymer having a segment of polystyrene joined to a segment of polyvinylidene chloride is obtained. The resulting product could be molded to form an attractive plastic article.

EXAMPLE VII

About 10 parts of polystyrene having a molecular weight of $5.4 \times 10^6$ are added to 1000 parts of toluene and 1500 parts of methyl vinyl ketone. Tubes containing the mixture are sealed in vacuo, darkened and shaken at 330 strokes a minute at room temperature. After several days, a large amount of copolymer has formed. Analysis indicated the polymer was made up of a segment of polystyrene joined to a segment of poly(methyl vinyl ketone).

EXAMPLE VIII

About 10 parts of polystyrene having a molecular weight of $6.33 \times 10^6$ are added to 1000 parts of toluene and 1500 parts of a mixture of 50% methyl acrylate and 50% vinyl acetate. Tubes containing the mixture are sealed and shaken at 330 strokes a minute at room temperature. The resulting product is an interpolymer made up of a segment of polystyrene joined to a segment of a copolymer of methyl acrylate and vinyl acetate.

EXAMPLE IX

A copolymer of 80 parts styrene and 20 parts acrylonitrile having a molecular weight of $5.8 \times 10^6$ are added to 1500 parts of toluene and 1500 parts of methyl methacrylate. Tubes containing the mixture are sealed and shaken at 330 strokes a minute at room temperature. The resulting product is an interpolymer of a segment of a copolymer of styrene and acrylonitrile and a segment of a homopolymer of methyl methacrylate. The resulting product can be folded to form an attractive plastic article.

Related results are obtained by replacing the acrylonitrile above with vinyl acetate.

EXAMPLE X

This example illustrates how the new copolymers containing a segment of polymer of a styrene compound can be prepared by the reverse procedure of breaking a polymer of the desired monomer in the presence of the monomeric styrene compound.

24 parts of polyisobutylene having a molecular weight of $2.2 \times 10^6$ prepared with a Friedel-Crafts catalyst at −80° C. were added to 1500 parts of styrene and 1500 parts of benzene. Tubes containing the mixture were sealed in vacuo, darkened, and shaken at 330 strokes a minute at room temperature. After 120 hours of shaking, 53 parts of a solid copolymer containing a segment of polyisobutylene joined to a segment of polystyrene was obtained. The resulting block copolymer could be molded to form an attractive plastic article.

EXAMPLE XI

About 10 parts of poly(vinyl butyl ether) having a molecular weight of $5.4 \times 10^6$ are added to 1000 parts of toluene and 1500 parts of styrene. Tubes containing the mixture are sealed in vacuo, darkened and shaken at 330 strokes a minute at room temperature. After several days, a large amount of copolymer has formed. The copolymer is made up of a segment of polystyrene joined in an end-to-end arrangement to a segment of polyvinyl butyl ether. The copolymer can be molded to form an attractive plastic article.

EXAMPLE XII

This example also illustrates how the new block copolymers can be prepared by the reverse procedure of breaking a polymer of styrene in the presence of a monomer of the polymer desired for the other segment.

About 10 parts of polyvinyl chloride having a molecular weight of $4.2 \times 10^5$ were added to 1000 parts of styrene and 100 parts of cyclohexanone and the mixture deoxygenated. Tubes containing the mixture are sealed in vacuo and shaken at 330 strokes a minute at room temperature. After several days, the tubes are opened and the unreacted monomer and solvent removed. The resulting product is identified as a block copolymer made up of a segment of polyvinyl chloride joined to a segment of polystyrene. This material can be molded to form an attractive plastic article.

EXAMPLE XIII

About 10 parts of polystyrene having a molecular weight of $6.33 \times 10^6$ are added to 1000 parts of acrylonitrile. Tubes containing the mixture are sealed and shaken at 330 strokes a minute at room temperature. After several days of shaking, the tubes are opened and the unreacted monomer removed. The resulting product is identified as a block copolymer made up of a segment of polystyrene joined to a segment of polyacrylonitrile. The product could be molded to form a plastic article.

EXAMPLE XIV

Example X is repeated with the exception that the polyisobutylene is replaced by each of the following: polyethylene having a molecular weight of $6 \times 10^6$, polypropylene having a molecular weight of about $5 \times 10^6$, and a copolymer of ethylene and propylene having a molecular weight of about $2.4 \times 10^6$. Related results are obtained in each case.

EXAMPLE XV

Example XI is repeated with the exception that the vinyl butyl ether is replaced with each of the following: vinyl ethyl ether, vinyl isopropyl ether and vinyl amyl ether. Related results are obtained.

EXAMPLE XVI

Example XIII is repeated with the exception that the acrylonitrile is replaced with methacrylonitrile. The resulting product is a block copolymer containing a segment of polystyrene joined to a segment of polymethacrylonitrile.

EXAMPLE XVII

Examples I to VIII are repeated with the exception that polystyrene is replaced with a copolymer of 80 parts styrene and 20 parts vinyl acetate. The resulting products are block copolymers wherein one of the segments is the above-described copolymer.

I claim as my invention:

1. A new type of copolymer wherein the macromolecules are made up of at least two different linear segments joined in an end-to-end arrangement, the first segment being a linear polymer of an alkenyl-substituted aromatic compound, and the other segment being a polymer of a monomer of the group consisting of esters of unsaturated alcohols and saturated monocarboxylic acids containing 1 to 6 carbon atoms, alkenes, vinyl halides, vinylidene halides, ethylenically unsaturated nitriles, alkenyl ethers and alkenyl ketones.

2. A new type of copolymer wherein the macromolecules are made up of at least two different linear segments joined in an end-to-end arrangement, the first segment being a linear polymer of styrene, and the other segment being a polymer of an alkenyl ester of a saturated mono carboxylic acid containing from 1 to 6 carbon atoms.

3. A new type of copolymer wherein the macromolecules are made up of at least two different linear segments joined in an end-to-end arrangement, the first segment being a linear polymer of styrene, and the other segment being a polymer of an alkene containing from 2 to 8 carbon atoms.

4. A new type of copolymer wherein the macromolecules are made up of at least two different linear segments joined in an end-to-end arrangement, the first segment being a linear polymer of styrene, and the other segment being a polymer of a vinyl halide.

5. A new type of copolymer wherein the macromolecules are made up of at least two different linear segments joined in an end-to-end arrangement, the first segment being a linear polymer of styrene, and the other segment being of a polymer of acrylonitrile.

6. A new type of copolymer wherein the macromolecules are made up of at least two different linear segments joined in an end-to-end arrangement, the first segment being a linear polymer of styrene, and the other segment being a polymer of a vinyl alkyl ether containing up to 10 carbon atoms.

7. A new type of copolymer wherein the macromolecules are made up of at least two different linear segments joined in an end-to-end arrangement, the first segment being a linear polymer of styrene, and the other segment being a polymer of an alkenyl alkyl ketone containing up to 10 carbon atoms.

8. A block copolymer made up of two different linear polymer segments joined in an end-to-end arrangement, the first segment being made up of polystyrene, and the second segment being a polymer of vinyl chloride.

9. A block copolymer made up of two different linear polymer segments joined in an end-to-end arrangement, the first segment being made up of polystyrene, and the second segment being a polymer of vinyl acetate.

10. A block copolymer made up of two different linear polymer segments joined in an end-to-end arrangement, the first segment being made up of polystyrene, and the second segment being a polymer of isobutylene.

11. A block copolymer made up of two different linear polymer segments joined in an end-to-end arrangement, the first segment being made up of polystyrene, and the second segment being a polymer of vinylidene halide.

References Cited by the Examiner

UNITED STATES PATENTS

| | | | |
|---|---|---|---|
| 2,123,599 | 7/38 | Fikentscher et al. | 260—17 |
| 2,317,859 | 4/43 | Soday | 260—880 |
| 2,338,741 | 1/44 | Soday | 260—880 |
| 2,991,269 | 7/61 | Nozaki | 260—4 |

MURRAY TILLMAN, *Primary Examiner.*

WILLIAM H. SHORT, JAMES A. SEIDLECK,
*Examiners.*